(12) United States Patent
Hagihara

(10) Patent No.: US 8,231,101 B2
(45) Date of Patent: Jul. 31, 2012

(54) RECEIVING OPENING OF JOINT FOR WORKING FLUID AND VALVE WITH THE RECEIVING OPENING

(75) Inventor: Shunichiro Hagihara, Nobeoka (JP)

(73) Assignee: Asahi Organic Chemicals Industry Co., Ltd., Nobeoka (JP)

( * ) Notice: Subject to any disclaimer, the term of this patent is extended or adjusted under 35 U.S.C. 154(b) by 975 days.

(21) Appl. No.: 11/364,295

(22) PCT Filed: Aug. 27, 2004

(86) PCT No.: PCT/JP2004/012376
§ 371 (c)(1),
(2), (4) Date: May 14, 2007

(87) PCT Pub. No.: WO2005/022018
PCT Pub. Date: Mar. 10, 2005

(65) Prior Publication Data
US 2009/0166574 A1 Jul. 2, 2009

(30) Foreign Application Priority Data
Aug. 29, 2003 (JP) .................................. 2003-307045

(51) Int. Cl.
*F16K 31/00* (2006.01)
(52) U.S. Cl. ......... 251/63; 251/63.5; 251/331; 251/368; 285/208
(58) Field of Classification Search ............... 251/62, 251/63, 63.5, 331, 368; 285/116, 115, 114, 285/288.8, 293.1, 294.4, 330, 331, 332.4, 285/382, 208
See application file for complete search history.

(56) References Cited

U.S. PATENT DOCUMENTS

| | | | | | |
|---|---|---|---|---|---|
| 2,926,935 | A | * | 3/1960 | La Marre | 285/184 |
| 3,348,570 | A | * | 10/1967 | Nealy | 137/315.36 |
| 3,415,942 | A | * | 12/1968 | Knoy | 174/51 |
| 3,633,947 | A | * | 1/1972 | Nelson | 285/233 |
| 3,634,598 | A | * | 1/1972 | Stanfield | 174/51 |
| 3,994,029 | A | * | 11/1976 | Badders | 4/367 |
| 4,667,062 | A | * | 5/1987 | Espevik | 174/489 |
| 4,714,278 | A | * | 12/1987 | Gassmann et al. | 285/148.13 |
| 5,000,488 | A | * | 3/1991 | Albrecht | 285/12 |
| 5,014,738 | A | * | 5/1991 | Jones | 137/340 |
| 5,330,237 | A | * | 7/1994 | Suzuki et al. | 285/281 |
| 5,361,802 | A | * | 11/1994 | Kroll et al. | 137/552 |
| 5,997,049 | A | * | 12/1999 | Kingsford et al. | 285/331 |
| 6,158,466 | A | * | 12/2000 | Riefler | 137/625.43 |
| 6,505,866 | B1 | * | 1/2003 | Nakamura et al. | 285/423 |
| 2002/0100509 | A1 | * | 8/2002 | Schlesch et al. | 137/597 |

FOREIGN PATENT DOCUMENTS

| | | |
|---|---|---|
| JP | 1-261582 | 10/1989 |
| JP | 5-203078 | 8/1993 |
| JP | 2001-295807 | 10/2001 |
| JP | 2002-174352 | 6/2002 |
| JP | 2002-295717 | 10/2002 |
| JP | 2003-83466 | 3/2003 |

* cited by examiner

*Primary Examiner* — John Fristoe, Jr.
*Assistant Examiner* — Marina Tietjen
(74) *Attorney, Agent, or Firm* — Jordan and Hamburg LLP

(57) ABSTRACT

The present invention relates to a duct connector for working fluid, that is durable and corrosion resistant, and a valve with the duct connector. The duct connector has a head portion with an internal fitting portion that fluidly communicates with the inside of a cylinder housing of the valve. It is affixed to the housing in such a manner that the head portion protrudes from the outer surface of the housing with the fitting portion being positioned outside the outer surface of the housing. Duct connectors may be formed by insert molding using a resin with a tensile elongation ratio of 50%-400% and tensile strength of 50 Mpa -200 MPa.

1 Claim, 7 Drawing Sheets

RECEIVING OPENING OF JOINT FOR WORKING FLUID AND VALVE WITH THE RECEIVING OPENING

BACKGROUND OF THE INVENTION

The present invention relates to a duct connector for a working fluid used in chemical plants or in such industrial fields as semiconductor manufacturing, liquid crystal manufacturing, and foods, and a valve having such duct connector; more particularly, it relates to a duct connector for a working fluid that has excellent rupture strength and excellent corrosion resistance, and a valve having the duct connector.

Conventionally, a resin cylinder housing used for a pneumatically driven valve has a construction where provided integrally on the peripheral side surface of a cylinder housing 44 is a duct connector 46 having a threaded fitting portion 45 communicating with the interior of the cylinder housing 44, as shown in FIG. 6. As is clear from the diagram, the female threading of the threaded fitting portion 45 has been provided up to the interior of the cylinder housing 44. The cylinder housing 44 has been made by injection molding, and to keep costs down, it has been necessary to mold the cylinder housing 44 without machining. Molding without machining requires the resin to have dimensional stability; in addition, use in a valve requires resistance to heat and chemicals. Resins that meet these requirements include glass-containing polyphenylene sulfide (PPS-G), polyvinylidene fluoride (PVDF-G), and polypropylene (PP-G); in particular, PPS-G has been used suitably for its dimensional stability. However, while offering excellent rigidity, PPS-G is also brittle. Thus generally, when connecting a nozzle for a working fluid to the threaded fitting portion 45 of the duct connector 46, in cases where the threaded fitting portion 45 is tapered, when the joint for working fluid is tightened, due to the taper, force is applied in the direction in which the duct connector 46 expands, and in cases where the threaded fitting portion 45 is straight, because sealing tape is wound around the joint for working fluid, force is applied in the duct connector 46 expanding direction. Therefore, to prevent breakage of the opening duct connector 46 portion of the cylinder housing 44, tightening is performed with a tightening torque of 0.4-0.5 Nm. Some workers, however, do not use torque wrenches, and apply a force greater than the prescribed torque, and PPS-G, which is both rigid and brittle, is unable to withstand a tightening torque greater than that prescribed, and the duct connector 46 portion breaks, so that even the cylinder housing 44 integral with the duct connector 46 breaks. In addition, if the cylinder housing 44 has been injection-molded, because of the structure of a channel communicating with the interior of the cylinder housing 44, a weld line will arise near the threaded fitting portion 45 of the duct connector 46. Because the weld line portion is weaker than other parts, when the nozzle for working fluid is connected to the duct connector 46, tightening with a greater-than-prescribed torque can easily cause breakage in the weld line portion; even after the nozzle for working fluid has been connected, an external load applied on the connection part of the nozzle for working fluid may cause breakage extending from the duct connector 46 to the cylinder housing 44.

To solve this problem, there have been inventions having a structure as shown in FIG. 7 (see, for example, patent reference 1). In this structure, an annular groove 49 is provided around a threaded fitting portion 48 formed in a plastic main housing 47, and a cylindrical metal insert 50 is inserted into the annular groove 49. The effect of the structure has been to strengthen the plastic threading 51 provided in the connection port 48 by reinforcing the metal insert 50.

Patent reference 1: Laid-open Japanese Patent Application H5-203078 (1993) (pages 5-6, FIG. 6)

However, with the threaded fitting portion 48 of the prior art, because the inserted metal insert 50 is exposed on the surface of the main housing 47, the cylindrical metal insert 50 can corrode, weakening the reinforcing effect, and in a corrosive atmosphere the threaded fitting portion 48 will break, entailing the problem that the threaded fitting portion cannot be used in such industrial fields as semiconductor manufacturing, in which chemicals that corrode metals are used. Further, if a rigid but brittle resin such as PPS-G is used for the main housing, because the plastic threading 51 and the main housing 47 are integrally formed, forceful tightening of the joint for working fluid may cause cracking in the plastic threading 51, with such cracks affecting the main housing 47, entailing the problem that the threaded fitting portion 48 may break.

In view of such problems with the prior art, it is an object of the present invention to provide a duct connector of a joint for working fluid that has excellent rupture strength and excellent corrosion resistance, and a valve comprising such a duct connector.

SUMMARY OF THE INVENTION

A duct connector for working fluid according to a first aspect of the present invention will be described with reference to FIG. 1. The first feature is that a threaded fitting portion 4 communicating with the interior of a cylinder housing 9 is affixed so as to protrude from the outside surface of the cylinder housing 9; the second feature is that duct connectors 1, 2 are affixed to the cylinder housing 9 by insert molding; and the third feature is that the duct connector for working fluid is formed of a resin with a tensile elongation of 50-400% and a tensile strength of 50-200 MPa. The second aspect of the present invention is a valve comprising a duct connector having the above features.

It is preferred that the tensile elongation of the resin used for the duct connector according to the present invention be within a range of 50-400%, and more preferably within a range of 50-150%. The tensile elongation must be at least 50% because the resin will be brittle at lower values. Further, the tensile elongation must be no greater than 400% because the tensile strength of a resin decreases as the tensile elongation increases. It is preferred that the tensile strength be within a range of 50-200 MPa, and more preferably within a range of 50-150 MPa. The tensile strength must be at least 50 MPa because if the tensile strength is too low, the duct connector will not be sufficiently strong and the duct connector may break when a nozzle for working fluid is connected. Further, the tensile elongation must be no greater than 200 MPa because if the tensile strength is higher, the elongation becomes too small. Resins that satisfy these conditions include polyether etherketone (PEEK), polyvinylidene fluoride (PVDF), and polyphenylene sulfide (PPS). If the duct connector will not be used in a corrosive atmosphere, the material for the duct connector is not limited to resins. Metals such as stainless steel, iron, copper or the like may be used.

Embodiments of the present invention will be explained with reference to the drawings, but the present invention is not limited to these embodiments.

DETAILED DESCRIPTION OF THE INVENTION

Figure 1:
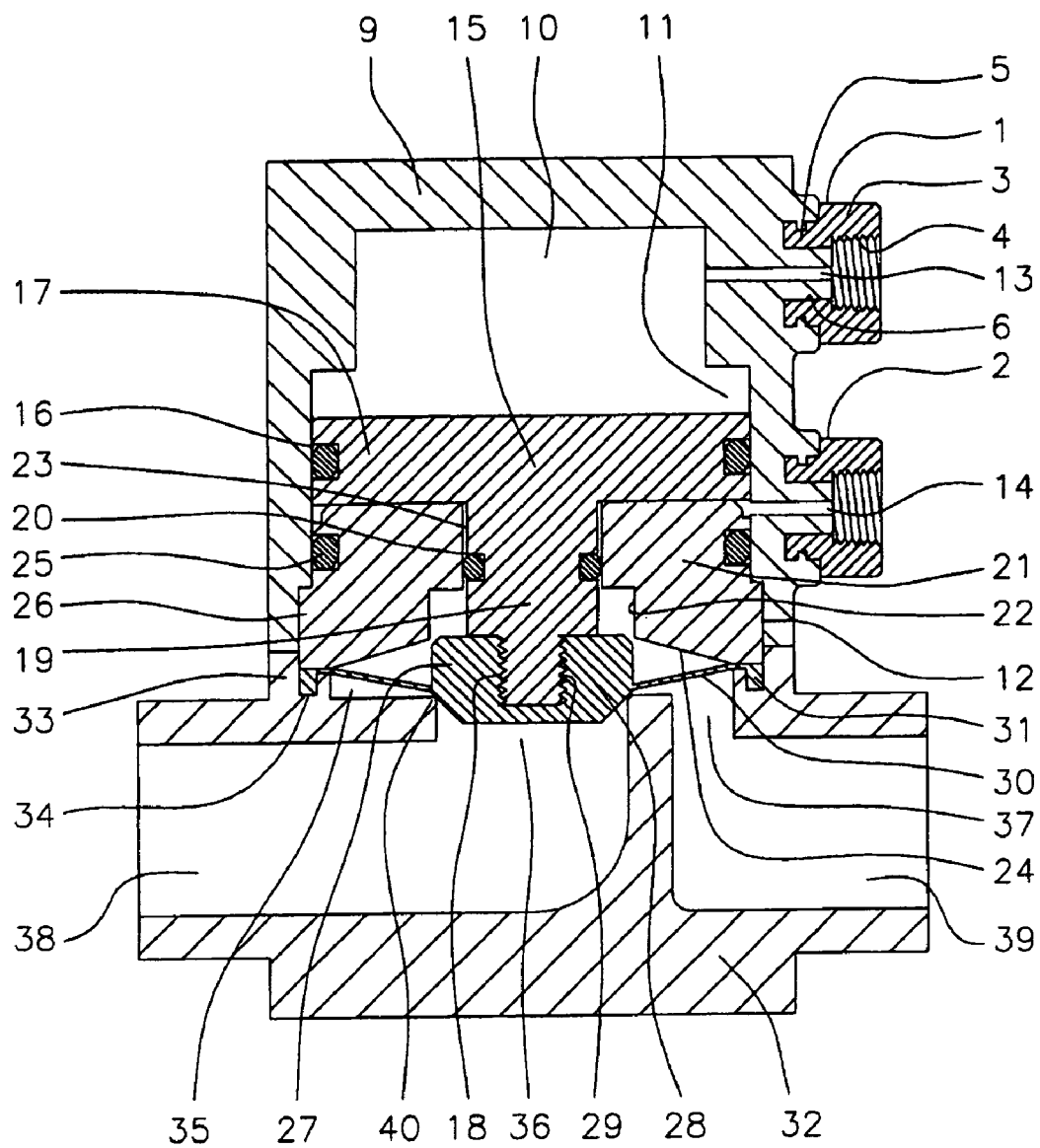
FIG. 1 is a vertical cross-sectional view showing a valve in a closed state having the duct connector according to the present invention.
Figure 2:
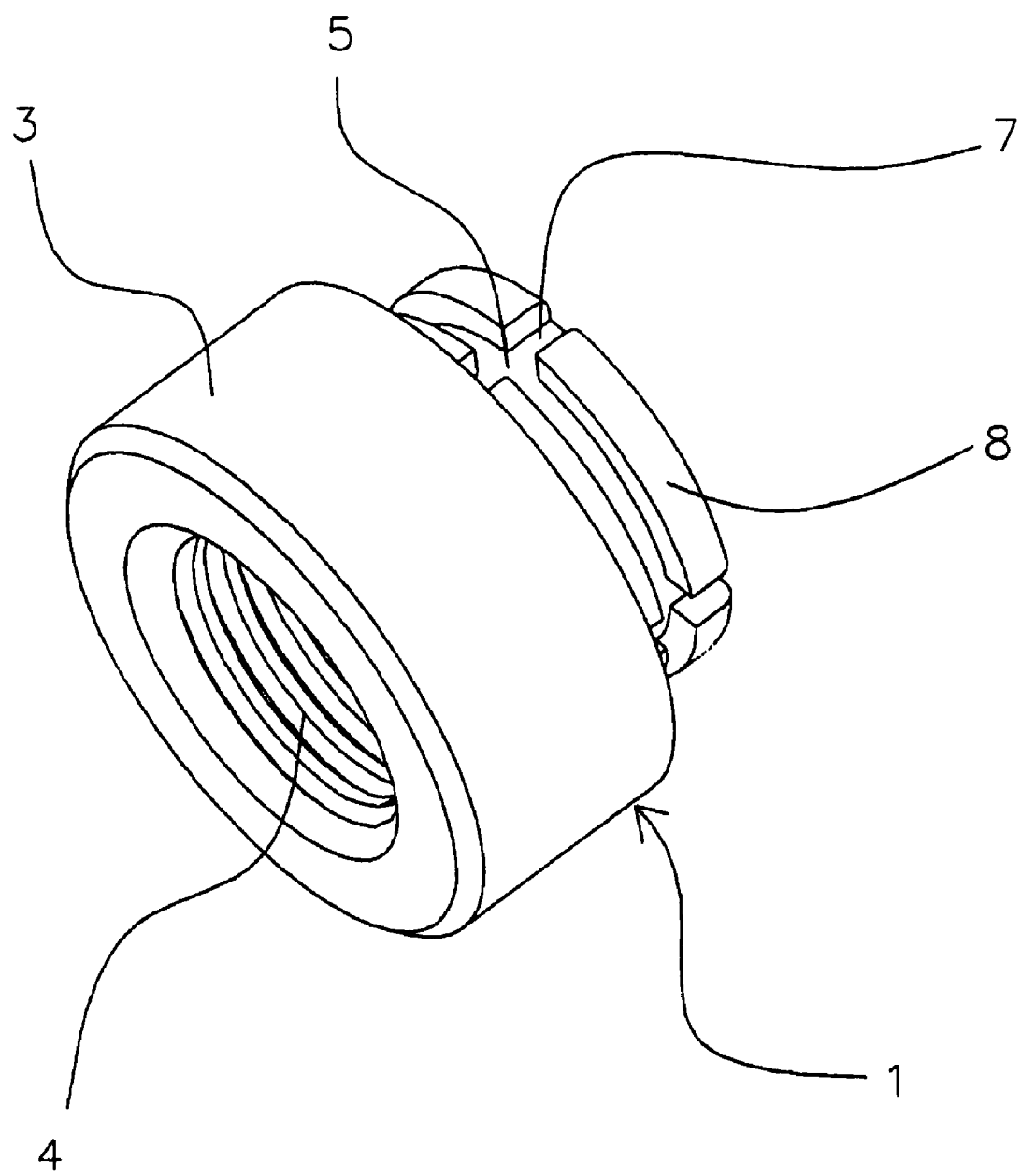
FIG. 2 is a perspective view showing the duct connector of FIG. 1.

The duct connector and the valve having the duct connector according to the embodiments of the present invention will be explained with reference to FIG. 1.

In the drawings, the numbers 1 and 2 denote PEEK duct connectors with a tensile elongation of 60% and tensile strength of 97 MPa, both having the same structure and operation. (The duct connector 1 will serve as representative in the explanation.) The number 3 denotes a head portion provided on one end of the duct connector 1 having an interior-threaded fitting portion 4 communicating with the interior of a cylinder housing 9 (described below). The threaded fitting portion 4 is affixed to the cylinder housing 9 so as to protrude from the outside surface of the cylinder housing 9, that is, a state where the threaded fitting portion 4 is positioned further outward than the exterior surface of the cylinder housing 9.

The number 5 denotes a base provided on the other end of the duct connector 1, the base 5 having a narrower diameter than the head portion 3, and affixed by insert molding in a state such that this base is enclosed within the cylinder housing 9. The base 5 has at the end thereof an anchor 8 around an annular flange having a plurality of notches 7 in the axial direction. The anchor 8 is configured so that the resin that filled in the notches 7 at time of insert molding into the cylinder housing 9 suppresses rotation of the duct connector 1, prevents the duct connector 1 from rotating when the joint for working fluid is screwed into the-threaded fitting portion 4, and prevents the duct connector 1 from coming loose from the cylinder housing 9.

Figure 5:
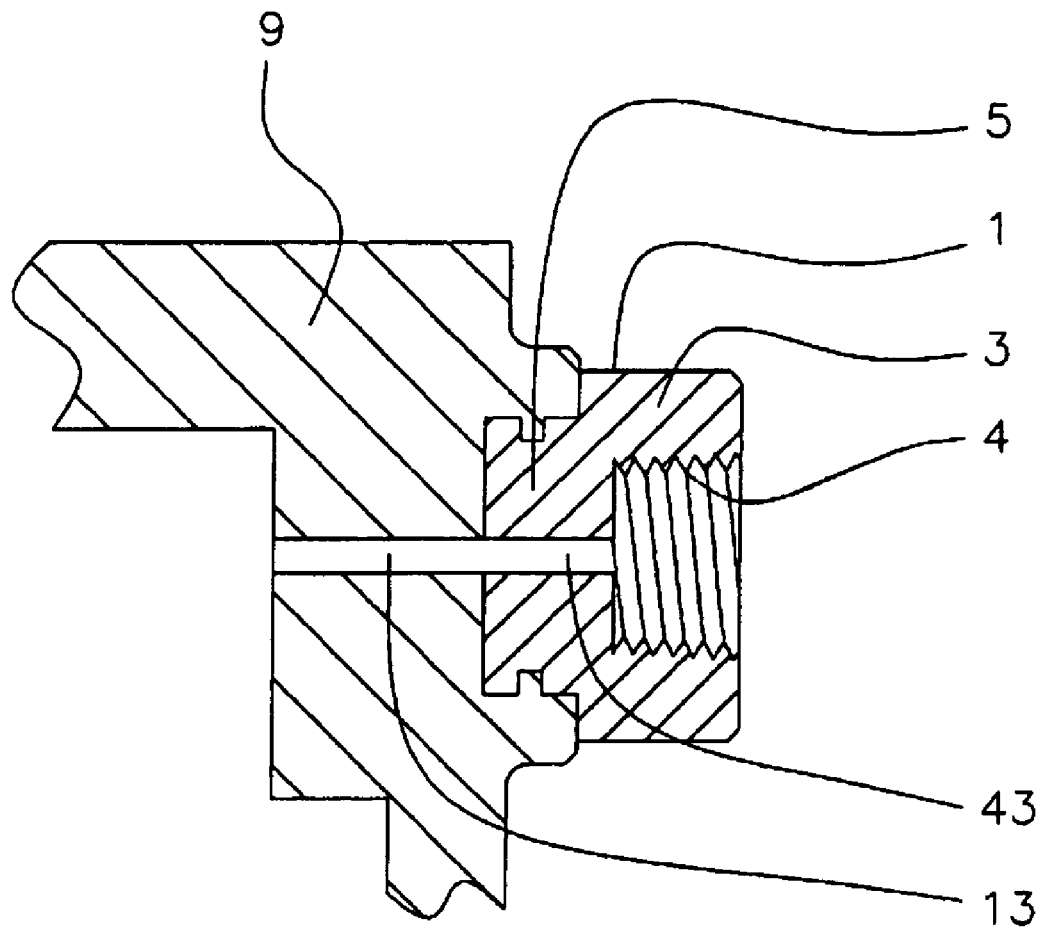
FIG. 5 is an enlarged vertical cross-sectional view of the important portions showing another embodiment of the duct connector according to the present invention.
Figure 6:
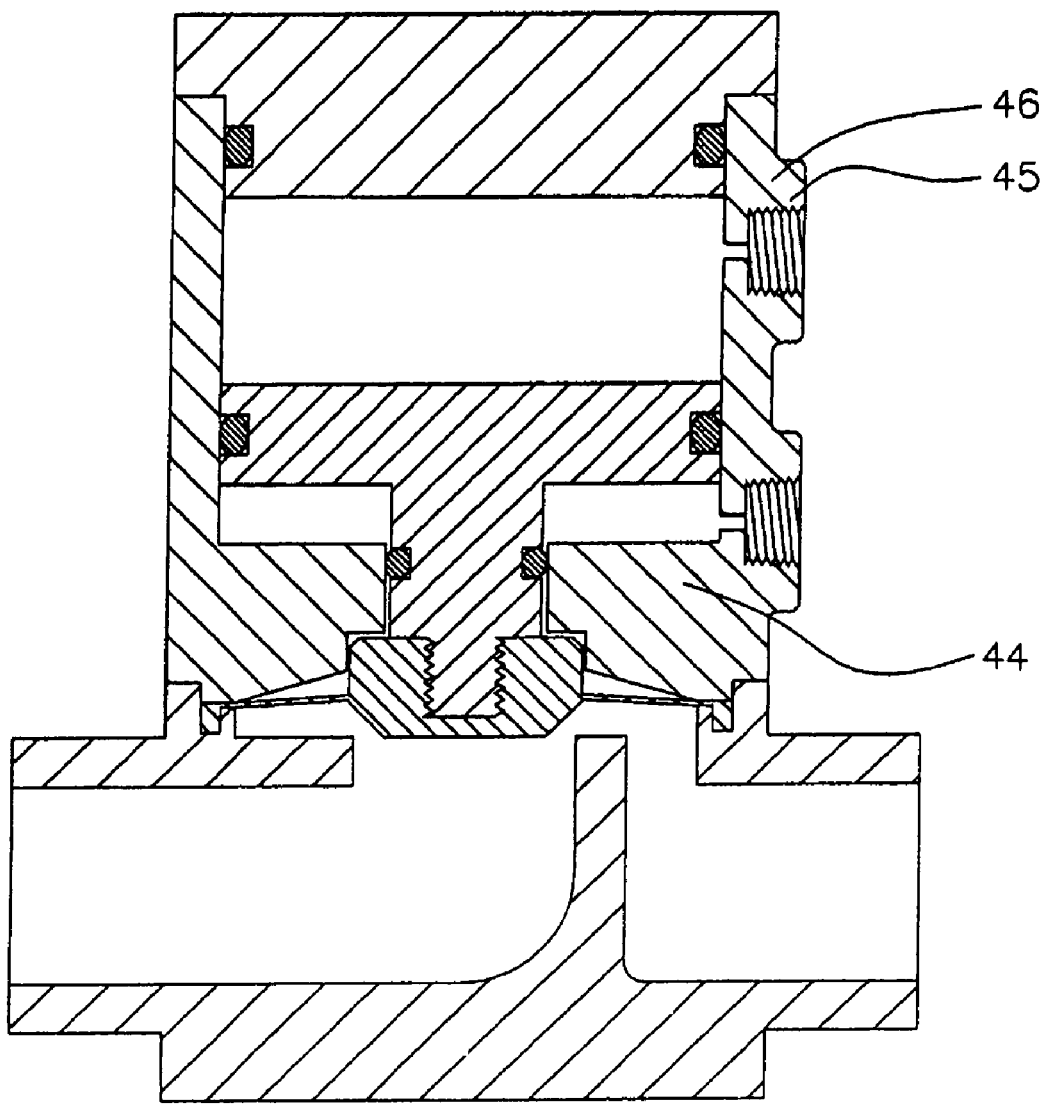
FIG. 6 is a vertical cross-sectional view of a valve having a conventional integrally formed duct connector.
Figure 7:
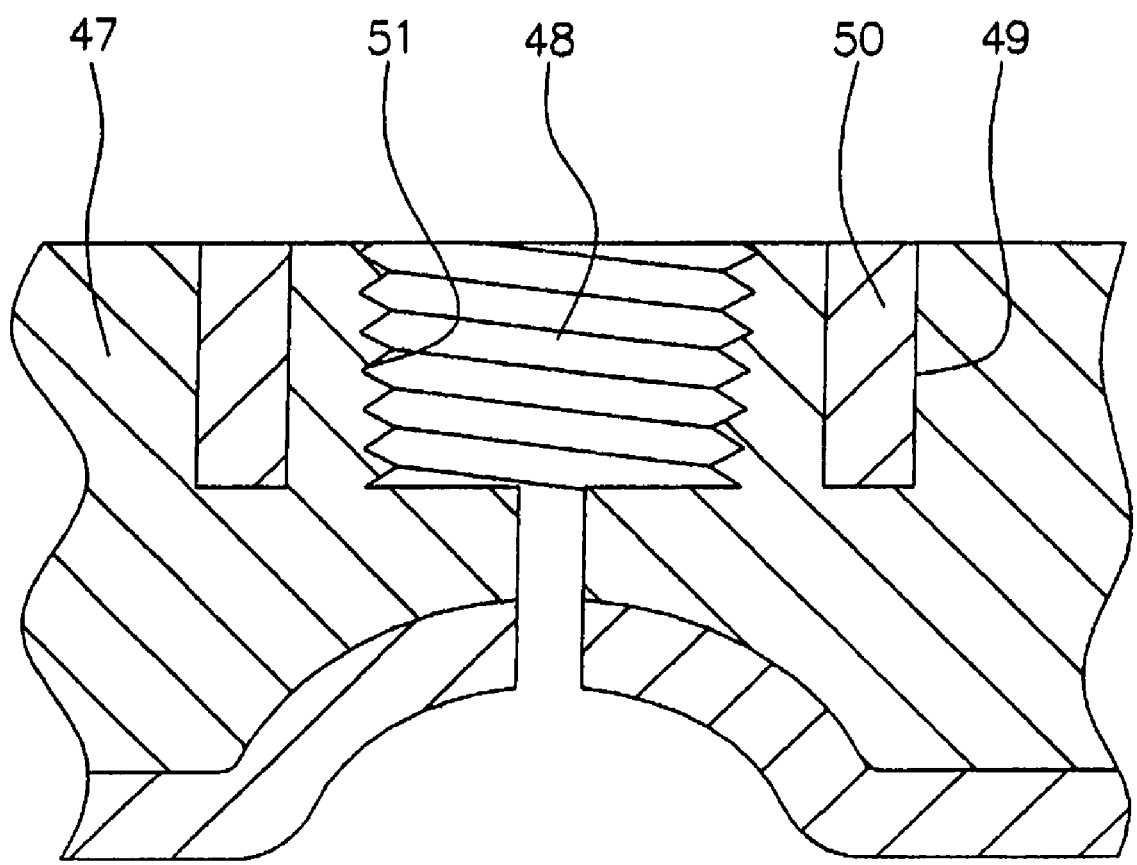
FIG. 7 is an enlarged vertical-cross sectional view of the important portions of a conventional metal-reinforced duct connector.

The base 5 has an internal surface 6 that is narrower than the threaded fitting portion 4. A portion of the cylinder housing 9 engages with the internal surface 6 and has a first working fluid supply channel 13 in the center thereof which fluidly communicates with the-threaded fitting portion 4 and engages with the internal surface 6. The shape of the duct connector 1 is not limited to that of the present embodiment. As shown in FIG. 5, as an alternative to the internal surface 6 in the base 5, a communicating channel 43 may be provided so as to communicate with the first working fluid supply channel 13 in the cylinder housing 9. Further, the duct connector 1 may be constructed so that any metal is embedded so as not to be exposed on the surface around the-threaded fitting portion 3.

In this embodiment, PEEK is used for the duct connector 1, but there are no particular restrictions with respect to resin provided that the resin has a tensile elongation of 50% or more, and preferably of 50-400%, and a tensile strength of 50 MPa or more, and preferably 50-200 MPa. The duct connector 1 in this embodiment is fixed by insert molding. Alternatively, it may be fixed by adhesion, screw-in engagement, welding, or other such means, provided that it is fixed so as to be sealed and non-rotatable with respect to the cylinder housing 9.

The number 9 denotes a PPS-G cylinder housing with a glass content of 65% affixed to the top of the main housing 32 (described below) by a bolt or nut (not pictured). The cylinder housing 9 has formed therein an upper cavity 10 and a lower cavity 11 formed in a stepped shape, with a diaphragm presser fitting part 12 formed further below; on the side of the cylinder housing 9, the duct connectors 1, 2 are fixed by insert molding, and there are formed a first working fluid supply channel 13 connecting the upper piston chamber 10 with the duct connector 1, and a second working fluid supply channel 14 connecting the lower piston chamber 11 with the duct connector 2. While the cylinder housing 9 in this embodiment is made of PPS-G, a resin such as PVDF-G, PP-G or the like may be used.

The number 15 denotes a piston comprising a flange 17 that has an annular groove 16 for holding an O-ring on the upper outer peripheral surface thereof; the piston 15 is disposed so as to freely slide up and down along the inner peripheral surface of the lower piston chamber 11 of the cylinder housing 9. On the bottom thereof, there is provided a shaft 19 hanging down from and integral with the flange 17 and having at its bottom end a bolt part 18, the shaft penetrating a through-hole 23 in a diaphragm presser 21 (below-described), and on a lateral surface of the shaft 19 there is provided an annular groove 20 for holding an O-ring.

The number 21 denotes the diaphragm presser; below this a recess 22 is formed in the shape of a cylinder with a bottom. Formed in the center of the upper surface of the recess 22 is the through-hole 23 through which the shaft 19 is inserted, and provided on the bottom surface of diaphragm presser 21 is a tapered part 24 that narrows in the direction of the recess 22. An O-ring 25 is fitted around the outer periphery of diaphragm presser 21. An annular projection 26 is formed in a lower outer peripheral surface of diaphragm presser 21, and is fitted into the diaphragm presser fitting part 12 of the cylinder housing 9.

The number 27 denotes a polytetrafluoroethylene (PTFE) diaphragm. Provided in the middle of the diaphragm 27 is a valve body 28 having an upper part accommodated in the recess 22 of the diaphragm presser 21 and a lower surface that presses against and separates from a valve seat 40 (described below). Provided on the upper surface of the valve body 28 is a-threaded fitting portion 29 that engages with the bolt part 18 of the shaft 19 of the piston 15. More specifically, the valve body 28 can move up or down as the piston moves up or down, pressing against and separating from the valve seat 40 of a main housing 32 (below-described), and can open or close a flow channel. A thin diaphragm 30 is provided on the peripheral edge portion of the valve body 28. In addition, an annular fitting part 31 having a rectangular cross-section is provided on the outer periphery of the diaphragm 30, sandwiched between the main housing 32 and the lower surface of the diaphragm presser 21 in a state of fitting with an annular groove 34 (below-described) of the main housing 32.

The number 32 denotes a PTFE main housing. The main housing 32 has on the upper part thereof an annular projection 33 that connects with the lower part of the cylinder housing 9, and the annular groove 34 in the inner periphery of the annular projection 33, the annular projection 33 having therein a valve chamber 35 formed together with the diaphragm 27. The valve chamber 35 has at the base thereof communicating channels 36, 37, the communicating channel 36 communicating with an inlet 38, and the communicating channel 37 communicating with an outlet 39. The opening of the communicating channel 36 is provided in the middle of the base of the valve chamber 35, and the peripheral edge of the communicating channel 36 serves as the valve seat 40.

Figure 3:
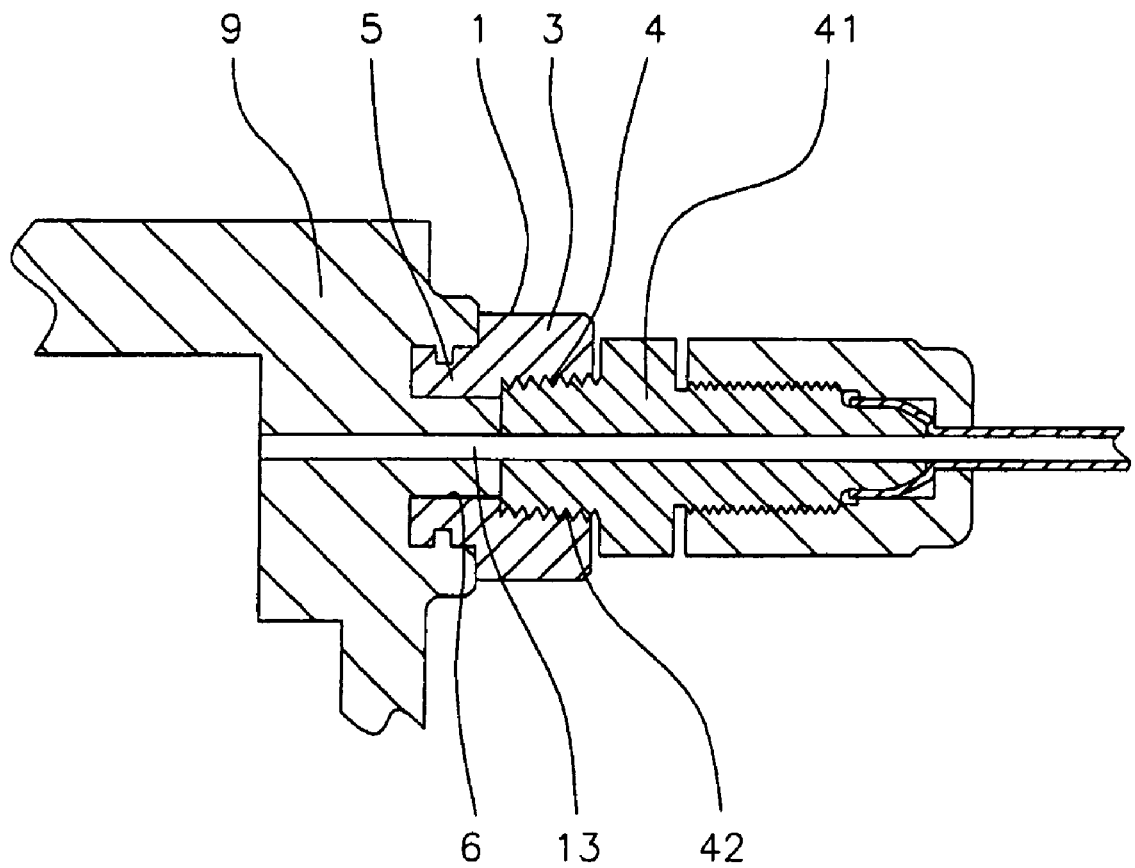
FIG. 3 is an enlarged vertical cross-sectional view of the important portions when the nozzle for working fluid is connected in FIG. 1.

Next, with reference to FIG. 3, explanation will be given of a method for connecting the nozzle for working fluid to a duct connector according to an embodiment of the present invention.

First, a PTFE sealing tape is wound around a threaded portion 42 of the working-fluid nozzle 41. Next, the threaded portion 42, with the sealing tape wound thereupon, is screwed into a threaded fitting portion 4 of the duct connector 1 using a torque wrench with a tightening torque of 0.5 Nm. The working-fluid nozzle 41 is screwed into the duct connector 2 by the same procedure. At this time, because a tapered threading is used for the threaded portion 42 of the working-fluid nozzle 41, at time of screwing, stress is applied in the direction in which the-threaded fitting portion 4 of the duct connector 1 expands. Thus, the-threaded fitting portion 4 communicating with the interior of the cylinder housing 9 is fixed in a state of being exposed from the outer surface of the cylinder housing 9, so even if stress is applied, causing the-threaded fitting portion 4 of the duct connector 1 to expand at time of connecting the working fluid nozzle 41, because the-threaded fitting portion 4 expands outwardly to a certain extent, the stress is relieved. Furthermore, with the threaded fitting portion 4 exposed from the outer surface of the cylinder housing 9, stress is applied only to the head portion 3 of the duct connector 1, not to the cylinder housing 9. Therefore, even if the working-fluid nozzle 41 is tightened with greater torque than prescribed, the cylinder housing 9 itself will not break. In addition, by using, as the material of the duct connector 1, PEEK with a tensile elongation of 60% and a tensile strength of 97 MPa, sufficient strength is maintained so that the head portion 3 will not break even if stress is applied in the expanding direction of the-threaded fitting portion 4 of the duct connector 1.

Figure 4:
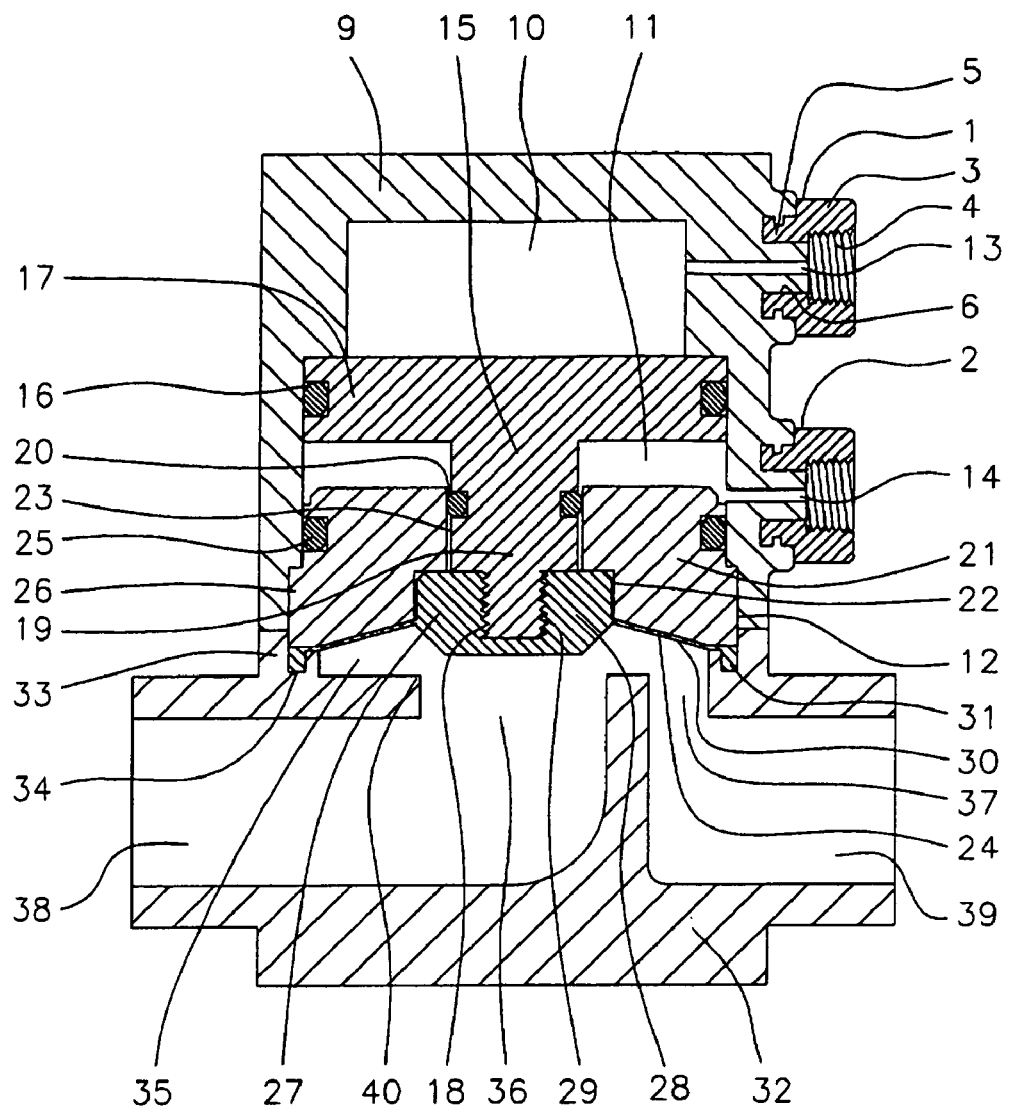
FIG. 4 is a vertical cross-sectional view showing the valve of FIG. 1 in an opened state.

Next, explanation will be given with reference to FIG. 1 and FIG. 4 of the operation of a valve according to an embodiment of the present invention. With the valve in a closed state (the state of FIG. 1), the valve body 28 is pressed against the valve seat 40, shutting off the flow channel. If in this state air serving as a working fluid is injected into the second working fluid supply channel 14, then air is injected into the lower piston chamber 11 formed between the piston 15 and the diaphragm presser 21, and the piston 15 is pushed upward by the pressure of the air. As a result, the valve body 28 connected to the piston 15 also separates from the valve seat 40 and is pulled upward, bringing the valve into an open state (the state of FIG. 4), and the fluid flows in through the inlet 38, passes through the communicating channel 36, the valve chamber 35, and the communicating channel 37, and flows out through the outlet 39. With the valve in an open state (the state of FIG. 4), if air serving as the working fluid is injected into the first working fluid supply channel 13, then air is injected into the upper piston chamber formed by the upper part of the piston 15 and the inner peripheral surface of the cylinder housing 9, and the piston 15 is pushed downward by the pressure of the air, so the valve body 28 connected to the piston 15 likewise is pushed downward and is pressed against the valve seat 40, thereby putting the valve into a closed state (the state of FIG. 1).

While the valve in this embodiment of the present invention is an air-driven stop valve, a valve may be driven hydraulically, and it may be a diaphragm valve, pinch valve or the like, and no particular restrictions are placed in such regard.

Further, the duct connector of the present invention is not limited to valves; the same effect can be obtained even when used on a pump and the like.

Duct connectors 1, 2 were fabricated using various resins, and destructive torque tests were carried out. The properties of each of the resins were evaluated by the method described below. The results are presented in Table 1.

Destructive Torque Test:

Tapered screws for pipe, serving as working fluid nozzle 41, were screwed into the-threaded fitting portions 4 of the duct connectors 1, 2, torque applied with a torque wrench was increased until breakage was seen in either of the duct connectors 1 and 2 or the cylinder housing 9, and the torque at which breakage was observed was recorded.

Because a tightening torque of up to about 3.0 Nm is expected when a tapered screw for pipes is tightened forcefully by hand, a rupture torque of 3.0 Nm or more was set as the standard for passing this test.

Test Example 1

Duct connectors were fabricated by injection molding using PEEK, and were insert-molded into a cylinder housing to make a test sample that was subject to a destructive torque test.

Test Example 2

Duct connectors were fabricated by injection molding using polyvinylidene fluoride (PVDF), and were insert-molded into a cylinder housing to make a test sample that was subject to a destructive torque test.

Test Example 3

Duct connectors were fabricated by injection molding using polyphenylene sulfide (PPS), and were insert-molded into a cylinder housing to make a test sample that was subject to a destructive torque test.

Comparative Example 1

Duct connectors provided integrally with a cylinder housing were injection-molded using PPS-G (with a glass additive content of 65% by weight) to make a test sample that was subject to a destructive torque test.

Comparative Example 2

Duct connectors were fabricated by machining using ethylene-tetrafluoroethylene copolymer (ETFE), and were insert-molded into a cylinder housing to make a test sample that was subject to a destructive torque test.

TABLE 1

| | | | Item | | | | |
| --- | --- | --- | --- | --- | --- | --- | --- |
| | | Unit | TE* 1 (PEEK) | TE* 2 (PVDF) | TE* 3 (PPS) | CE* 1 (PPS-G) | CE* 2 (ETFE) |
| Material properties | Tensile elongation | % | 60.0 | 50.0 | 50.0 | 1.3 | 250 |
| | Tensile strength | MPa | 97 | 55 | 75 | 142 | 16 |

TABLE 1-continued

| | Unit | TE* 1 (PEEK) | TE* 2 (PVDF) | TE* 3 (PPS) | CE* 1 (PPS-G) | CE* 2 (ETFE) |
|---|---|---|---|---|---|---|
| Rupture torque | Nm | 6.0 | 3.0 | 5.0 | 1.5 | 2 |
| Broken part | | Nut | Nut | Nut | Cylinder housing | Opening |

*TE = Test example, CE = Comparative example

Evaluation will be made of the physical properties of each resin, based on Table 1.

(1) With the PEEK of test example 1, the tensile elongation was 60%, the tensile strength was 97 MPa, and the thread groove of the-threaded fitting portion broke at time of rupture, but the cylinder housing serving as the principal part did not break. The rupture torque was 6.0 Nm, a strength twice that of 3.0 Nm, and this greatly exceeds the passing standard, so PEEK is most suitable as a material for a duct connector.

(2) With the PVDF of test example 2, the tensile elongation was 50%, the tensile strength was 55 MPa, and the thread groove of the threaded fitting portion broke at time of rupture, but the cylinder housing did not break. The rupture torque was 3.0 Nm, which is equal to the passing standard, so PVDF is suitable as a material for a duct connector.

(3) With the PPS of test example 3, the tensile elongation was 50%, the tensile strength was 75 MPa, and the thread groove of the-threaded fitting portion broke at time of rupture, but the cylinder housing did not break. The rupture torque was 5.0 Nm, which greatly exceeds the passing standard, so PPS is suitable as a material for a duct connector.

(4) With the PPS-G of comparative example 1, the tensile elongation was 1.3%, the tensile strength was 142 MPa, the tensile elongation was low, and the cylinder housing broke at time of rupture. The rupture torque was 1.5 Nm, and although there will be no problem when tightening at the prescribed torque, because the passing standard is not met, and there is breakage in the cylinder housing itself, PPS-G is not suitable as a material for a duct connector.

(5) With the ETFE of comparative example 2, the tensile elongation was 250%, the tensile strength was 46 MPa, the tensile strength was somewhat low, and the duct connector broke at rupture. The rupture torque was 2.5 Nm, which presents no problems when tightening at the prescribed torque, but the torque does not meet the passing standard, so ETFE is not suitable as a material for a duct connector.

As is clear from the above, especially from comparing the two examples of PPS in test example 3 and comparative example 1, a duct connector having excellent rupture strength can be obtained by using a material that satisfies the conditions of having a tensile elongation of 50% or more and a tensile strength of 50 MPa or more. Further, the resins used in these tests have excellent resistance to corrosion and chemicals, and can be used in a corrosive atmosphere with no concern about breakdown caused by corrosion. In particular, using PEEK will yield a duct connector that has very high rupture strength and excellent resistance against corrosion and chemicals.

(1) Because a duct connector is affixed to a resin cylinder housing in a state in which the-threaded fitting portion communicating with the interior of the cylinder housing is exposed, even if, when a joint for working fluid is connected with a high tightening torque, stress is applied in the duct connector expanding direction, because through slight expansion of the-threaded fitting portion of the duct connector, the stress will be relieved, and breakage will not extend to the resin cylinder housing.

(2) A resin duct connector with both a tensile elongation of 50% or more and a tensile strength of 50 MPa or more will not break even if screwed on with a tightening torque above the standard.

(3) A duct connector made of resin will neither corrode nor break in a corrosive atmosphere as would happen if it were made of metal.

In other words, because the duct connector of the present invention is affixed to the resin cylinder housing in a state in which the duct connector head is exposed, there is no danger that a resin cylinder housing will break when a nozzle for working fluid is screwed on. Further, using resin for the duct connector ensures that the duct connector will not breakdown even in a corrosive atmosphere, so it can be used in a variety of pneumatically or hydraulically driven valves, including stop valves, diaphragm valves, and pinch valves. In addition, the duct connector of the present invention is not limited to valves but will have the same effects even if used for pumps, etc.

What is claimed is:

1. A valve and resin cylinder housing therefor being formed of a resin including glass fibers, comprising:
   a receiving opening structure of a joint for working fluid comprising a resin providing a tensile elongation of 50%-400% and a tensile strength of 50 MPa-200 MPa, the receiving opening structure being configured as a one-piece construction that is affixed to the resin cylinder housing and comprises
   a head portion comprising terminal end portions that abut outer peripheral portions of the resin cylinder housing and a nut portion on one end of the receiving opening structure that abuts outermost peripheral portions of the resin cylinder housing relatively adjacent the outer peripheral portions abutted by the terminal end portions so as to extend entirely continuously and uninterrupted from the resin cylinder housing, and
   a base portion continuous with the head portion and positioned on an opposite end of the receiving opening structure, the base portion, nut portion and head portions each comprising a respective diameter, the diameter of the base portion being smaller than the diameter of the head portion, and portions of the receiving opening structure intermediate the base portion and the nut portion comprising a diameter smaller than the nut portion diameter so that the nut portion comprises a larger relative diameter portion that substantially overlaps the outer peripheral surface of the resin cylinder housing at a point of abutment therewith, the nut portion being entirely horizontally and vertically spaced from the terminal end portions of the head portion that abut outer peripheral portions of the resin cylinder housing.

* * * * *